(12) United States Patent
Kurihara et al.

(10) Patent No.: US 8,767,774 B2
(45) Date of Patent: Jul. 1, 2014

(54) CONTENT PROVISION SYSTEM, CONTENT GENERATION APPARATUS, CONTENT REPRODUCTION APPARATUS, AND CONTENT GENERATION METHOD

(75) Inventors: Shinichi Kurihara, Yokohama (JP); Sunao Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1069 days.

(21) Appl. No.: 12/700,024

(22) Filed: Feb. 4, 2010

(65) Prior Publication Data

US 2010/0235876 A1 Sep. 16, 2010

(30) Foreign Application Priority Data

Mar. 16, 2009 (JP) ................... 2009-062420

(51) Int. Cl.
*H04J 3/24* (2006.01)
*H04N 7/16* (2011.01)

(52) U.S. Cl.
USPC ............................ 370/473; 370/474; 725/136

(58) Field of Classification Search
None
See application file for complete search history.

(56) References Cited

U.S. PATENT DOCUMENTS

| | | | |
|---|---|---|---|
| 2001/0017482 A1* | 8/2001 | Roy et al. ................ | 297/314 |
| 2003/0229900 A1* | 12/2003 | Reisman ................ | 725/87 |
| 2006/0083218 A1* | 4/2006 | Sako et al. ............. | 370/352 |
| 2006/0291473 A1* | 12/2006 | Chase et al. ............ | 370/395.5 |
| 2008/0043204 A1* | 2/2008 | Guo ....................... | 352/85 |
| 2008/0218488 A1* | 9/2008 | Yang et al. ............. | 345/173 |

FOREIGN PATENT DOCUMENTS

| | | |
|---|---|---|
| JP | 2002-253868 | 9/2002 |
| JP | 2003-324402 | 11/2003 |
| JP | 2004-159879 | 6/2004 |
| WO | WO 2010/007987 A1 | 1/2010 |

OTHER PUBLICATIONS

First Office Action issued by Japanese Patent Office in Japanese Patent Application No. 2010-028020, mailed Apr. 10, 2012, (2 pages).

* cited by examiner

*Primary Examiner* — Brian T Pendleton
*Assistant Examiner* — Dika C. Okeke
(74) *Attorney, Agent, or Firm* — Finnegan, Henderson, Farabow, Garrett & Dunner, LLP

(57) ABSTRACT

A content provision system provides a content reproduction apparatus with content including main information which is at least either of video information and audio information generated by a content generation apparatus. The content generation apparatus generates a bodily sensation element by applying numeric conversion to characteristics of a bodily sensation given to a user, generates instruction information to reproduce the bodily sensation element in synchronism with reproduction of the main information, generates bodily sensation information by adding the instruction information to the bodily sensation element, and generates content including the bodily sensation information by adding the bodily sensation information to the main information. The content reproduction apparatus separates the main information and the bodily sensation information from the content, reproduces the main information, separates the bodily sensation element and the instruction information from the bodily sensation, and reproduces bodily sensation element based on the instruction information.

5 Claims, 4 Drawing Sheets

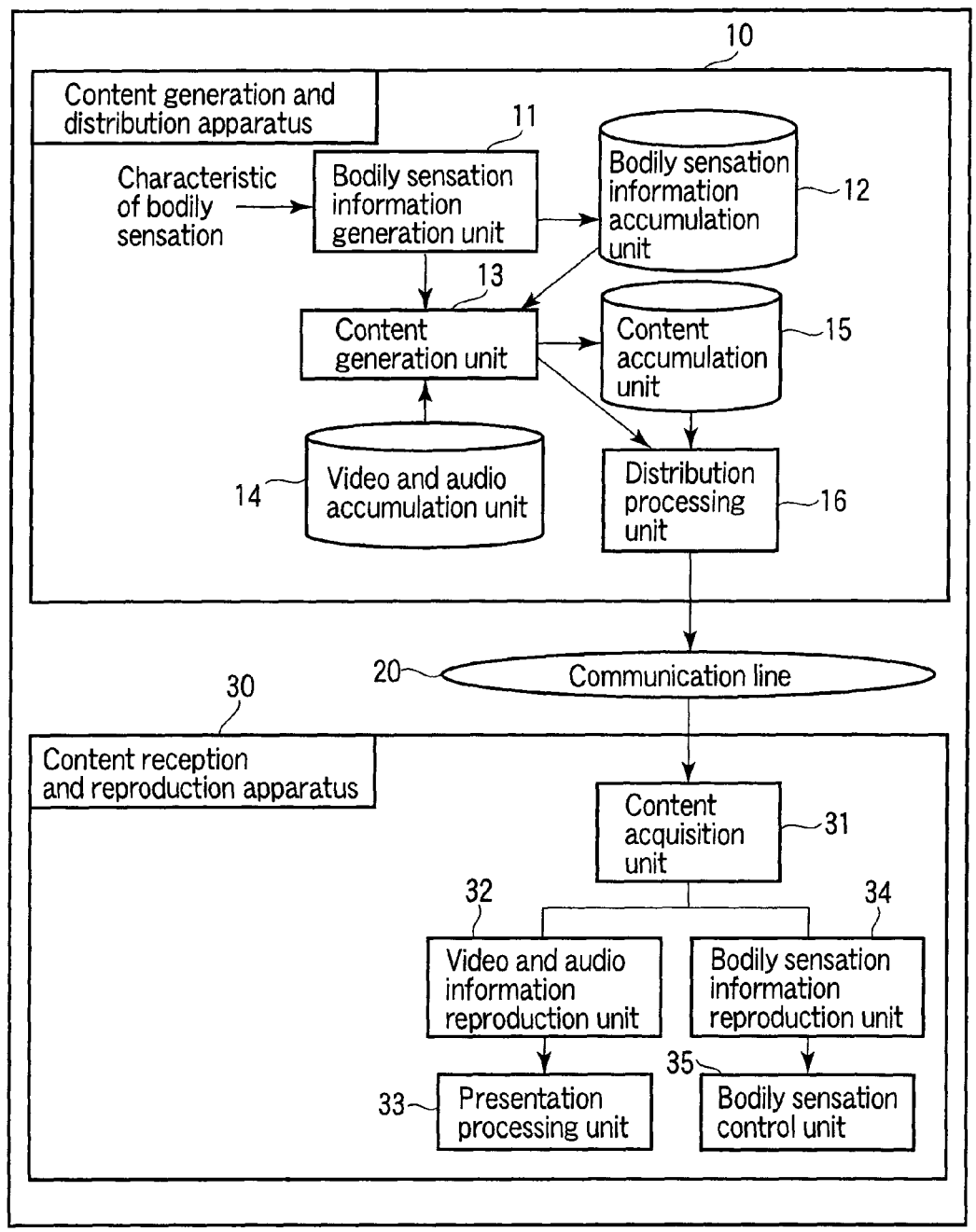
F I G. 1

Bodily sensation information parameter (example)

| Item | Flag | Value |
|---|---|---|
| Direction | 1 | Within bodily sensation information element |
| Five-sense information | 1 | Vibration, watching, listening, smell, taste sensation, air temperature, humidity |
| Period | 1 | Start point to end point |
| Volume | 1 | Within bodily sensation element |
| Apparatus information | 1 | TYPE1,TYPE7 |
| ⋮ | ⋮ | ⋮ |

Bodily information element (example: vibration)

| Direction | | | Value |
|---|---|---|---|
| X | Y | Z | |
| 0000 | 0000 | 0000 | None |
| 0010 | −0010 | 0000 | Small |
| 0020 | −0020 | 0000 | Small |
| 0010 | −0010 | 0000 | Small |
| 0000 | 0000 | 0000 | None |
| 0100 | 0100 | −0100 | Middle |
| 0000 | 0050 | −0200 | Middle |
| −0100 | 0000 | −0100 | Middle |
| 0000 | 0000 | 0000 | None |
| 1000 | −0500 | 1000 | Large |
| 0500 | 0000 | 0500 | Large |
| 0000 | 0000 | 0000 | Large |
| ┆ | ┆ | ┆ | ┆ |

FIG. 6

CONTENT PROVISION SYSTEM, CONTENT GENERATION APPARATUS, CONTENT REPRODUCTION APPARATUS, AND CONTENT GENERATION METHOD

CROSS-REFERENCE TO RELATED APPLICATIONS

This application is based upon and claims the benefit of priority from prior Japanese Patent Application No. 2009-062420, filed Mar. 16, 2009, the entire contents of which are incorporated herein by reference.

BACKGROUND OF THE INVENTION

1. Field of the Invention

One embodiment of the invention relates to a content generation and distribution system configured to generate and provide content added service information to a video and audio information.

2. Description of the Related Art

Recently, broadband has become used widely and internet Protocol (IP) broadcasting and a video-on demand service, which distributes content through video and audio by using a communication line, has been prevailing popular. Among of them, a service, such as an interactive game service, incorporates reproduction of video with a user's action via the communication line.

Meanwhile, recreational facilities such as amusement parks and movie theaters may utilize apparatuses configured to vibrate chairs and floors in synchronization with video and audio to make visitors excite bodily sensation with reality which is impossible to enjoy at ordinary home. Then, it has become desired to actualize a system capable of easily enjoying bodily sensation with actual feeling which can be gotten in the recreation facilities in reproduction of the video and the audio even at the ordinary home.

A scheme configured to incorporate external equipment in synchronization with the video and the audio of broadcast content in reproduction of the content is disclosed in Jpn. Pat. Appln. KOKAI publication No. 2003-324402. The scheme disclosed in the patent document given above generates a broadcasting program (content) in which video and audio are associated with sensitivity information expressing an extent of perception or sensitivity to send it to a content reproduction apparatus. The scheme connects an external display device via a home network and interlocks the display device on the basis of the sensitivity information associated with the video and audio, and then, produces high presence. While this scheme sends the sensitivity information in synchronization with the scene of the video and audio, since the sensitivity information is only information which expresses the extent of perception or sensitivity of brightness, darkness, hotness, coldness, etc., representation does not always turn out as a content producer wants it to.

As mentioned above, it has become desired to actualize a system capable of easily enjoying bodily sensation with actual feeling which can be gotten in the recreation facilities in the reproduction of the distributed content.

BRIEF SUMMARY OF THE INVENTION

It is an object of one embodiment of the present invention to provide a content generation and distribution system, a content generation apparatus, a content reception and reproduction apparatus, and a content generation method which can instruct to give a bodily sensation matching with content in distribution of the content of video and audio, and then, have an effect of reproduction of the bodily sensation instructed in the reproduction of the content on a reproduction side.

According to first embodiment of the invention, there is provided a content generation and distribution system comprising: a content provision system configured to provide content including main information which is at least either of video information and audio information generated by a content generation apparatus to a content reproduction apparatus, wherein the content generation apparatus comprises: a first generator configured to generate a bodily sensation element by applying numeric conversion to characteristics of a bodily sensation given to a user;

a second generator configured to generate instruction information to reproduce the bodily sensation element in synchronism with reproduction of the main information; a third generator configured to generate bodily sensation information by adding the instruction information to the bodily sensation element; and a fourth generator configured to generate content including the bodily sensation information by adding the bodily sensation information to the main information, the content reproduction apparatus comprises: a first separator configured to separate the main information and the bodily sensation information from the content; a first reproduction unit configured to reproduce the main information; a second separator configured to separate the bodily sensation element and the instruction information from the bodily sensation information; and a second reproduction unit configured to reproduce the bodily sensation element based on the instruction information.

According to second embodiment of the invention, there is a content generation apparatus comprising: a first generator configured to generate bodily sensation element by applying numeric conversion to a characteristic of a bodily sensation; a second generator configured to generate instruction information to reproduce the bodily sensation element in synchronism with reproduction of the main information which is at least either of video information and audio information; and a third generator configured to generate bodily sensation information to the bodily sensation element; a fourth generator configured to generate content including the bodily sensation information by adding the bodily sensation information to the main information.

According to third embodiment of the invention, there is a content reproduction apparatus which reproduces content with the bodily sensation information according to the embodiment, the apparatus comprising: a first separator configured to separate the main information and the bodily sensation information from the content; a first reproduction unit configured to reproduce the main information; a second separator configured to separate the bodily sensation element and the instruction information from the bodily sensation information; and a second reproduction unit configured to reproduce bodily sensation element based on the instruction information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary block diagram depicting one embodiment of a content provision system of the invention;

FIG. 6 is an exemplary view depicting an example of bodily sensation elements for use in the bodily sensation in the embodiment.

DETAILED DESCRIPTION OF THE INVENTION

Hereinafter, embodiments of the invention will be described in detail with reference to the drawings.

FIG. 1 shows a block diagram illustrating an embodiment of a content provision system of the invention. In FIG. 1, a content generation and distribution apparatus 10 generates to store content in which bodily sensation is added to video and audio information, and distributes the content with the required bodily sensation in response to a content distribution request from a content reception and reproduction apparatus 30 to be connected to a communication line (IP network, etc.) 20. The reception and reproduction apparatus 30 receives the distributed content to separate it into the video/audio information and the bodily sensation information, and reproduces each items of the information.

Each component of the aforementioned apparatuses 10, 30 will be described in turn.

Figures 4, 5:
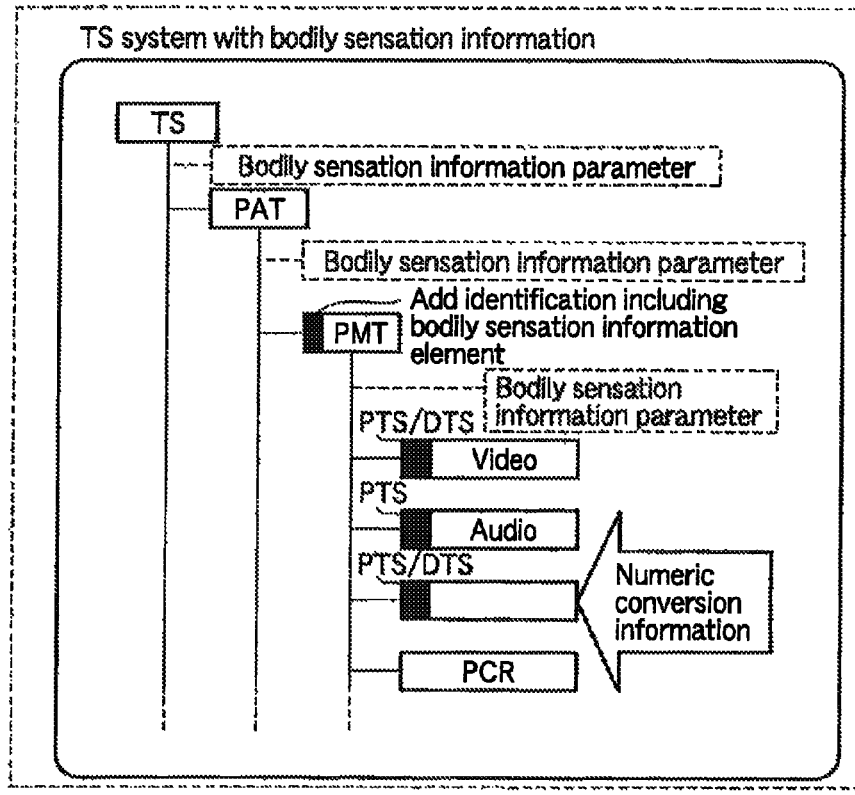
FIG. 4 is an exemplary schematic view depicting a TS system in a case in which the bodily sensation in the embodiment is added.
FIG. 5 is an exemplary view depicting examples of bodily sensation information parameters for use in the bodily information in the embodiment.

At first, in the content generation and distribution apparatus 10, a bodily sensation information generation unit 11 utilizes an ordinary authoring device, and when a characteristic of bodily sensation is given, applies numeric-conversion (sampling) to the characteristics of the element, and generates, for example, at least any one of a parameter table (items, execution flags, values) shown in FIG. 5 and an element table (directions (X, Y, Z), volumes (large, middle, small, none)) shown in FIG. 6 and accumulates them in a bodily sensation element accumulation unit 12.

When receiving an instruction so as to generate the content with the bodily sensation from a producer, a content generation unit 13 reads the video and audio information instructed by the producer from a video and audio accumulation unit 14 and re-edits the information according to a thumbnail along with, for example, a time chart in accordance with an operation input of the producer. In this re-editing, as the generation unit 13 selects an arbitrary bodily sensation element among a plurality of kinds of the bodily sensation elements previously accumulated in the accumulation unit 15, and sequentially inputs to specify the content of the representation into predetermined items in the parameter table (items, execution flags, values) and the element table (directions (X, Y, Z), volumes (large, middle, small, none)), the generation unit 13 generates the bodily sensation information for arbitrary reproduction sections. The content with the bodily sensation information is accumulated in a content accumulation unit 15. When desiring use of a new bodily sensation element, the generation unit 13 uses the bodily sensation information generated from the new bodily sensation element by the information generation unit 11.

Regarding the way of specifying the item of the bodily sensation information, for example, for specifying parameters, if the direction is desired to be specified, the content generation unit 13 sets a flag "1" as an item of five senses, specifies any one of senses listed in advance, so that numbers corresponding to the respective vibration, viewing, listening, smell, taste sensation, air temperature, etc., are registered.

Other than this, regarding a reproduction period of individual bodily sensation, the content generation unit 13 sets a flag "1" as an item of a period, specifies a start point and an end point along with the time chart of the video and voice information, and then, registers the reproduction period. When desiring to specify a volume, the content generation unit 13 sets a flag "1" as an item of a volume, specifies, as the volume, a volume element (large, middle, small, none) in the element table, so that a corresponding-number is registered. Apparatus information, realizing the effect of representation based on the generated bodily sensation information, is registered by setting "1" into an item of apparatus information, and for example, by selecting classification information such as a type 1 and a type 7.

In the generation of the bodily sensation information, the generation unit 13 also determines an upper limit and a lower limit whether or not the bodily sensation information can be reproduced in a reception side. For applying numeric conversion to the bodily sensation elements, the generation unit 13 decides sampling values with reference to at least one of a rate included in the video and audio information, various items of time information, a program clock reference (PCR) value, and a decoding time stamp (DTS). The bodily sensation elements are individually applied the numeric conversion in response to predefined bodily sensation. While referring to the reproduction content of the video and audio information, a time when a series of items of the bodily sensation information becomes unnecessary, the time is set as the end point. The specifying of the start point and the end point may be set as a period from the start to the end of the reproduction of the video and audio information, and may be partially specified as a period in the middle of the reproduction period.

The reference to the reproduced content of the video and audio information is performed by means of a presentation device (not shown) such as a display and loud-speaker. For applying the numeric conversion to the bodily sensation elements, it is desired to take compatibility with the video and audio information into account, and systematize by using at least one of the bodily sensation information parameters and the bodily sensation information elements as mentioned above.

To add the bodily sensation information to the video and audio information, the content generation unit 13 analyzes a stream structure of the selected video and audio information and multiplexes the bodily sensation information by interlocking with at least one of a presentation time stamp (PTS) giving a presentation time of audio and video existing in the video and audio information, a decoding time stamp (DTS) giving a decoding start time, and a program clock reference (PCR).

On this occasion, it is preferable to optimize the locking by generating necessary information and correcting the bodily sensation information with the numeric conversion applied thereto, and it is desirable to multiplex the bodily sensation information by changing PCR values and changing positions of PCR packets. The content in which the bodily sensation information is multiplexed to the video and audio information is accumulated in the content accumulation unit 15 or a distribution processing unit 16.

The distribution processing unit 16 acquires the content with the bodily sensation information required from the content reception and reproduction apparatus 30 or from the content accumulation unit 15, and distributes the content with the bodily sensation information to the content reception and reproduction apparatus 30 that is a request origin via the communication line 20. Here, if the content with the bodily sensation information is a time stamp (TS) packet, the distribution processing unit 16 eliminates and transmits packets such as NULLs unnecessary for a service, after adding a four-byte TS to the content with the bodily sensation. In this way, the transmission of the content with the bodily sensation by eliminating the unnecessary packets results in a reduction in a burden on the communication line 20 and the transmission is made effective. The PTS is generated by means of a clock of 27 MHz.

Meanwhile, in the content reception and reproduction apparatus 30, a content acquisition unit 31 receives the information of the content with bodily sensation information distributed from the content generation and distribution device 10 via the communication line 20 and separates into the video/audio information and the bodily sensation information. The separated video and audio information are reproduced by means of a video and audio information reproduction unit 32 to be sent to a presentation processing unit 33, and the bodily sensation information is reproduced by means of a bodily sensation information reproduction unit 34 to be sent to a bodily sensation control unit 35.

At this time, it is desirable for the information to be sent to the reproduction unit 34 to be added all items or a part item of the video and audio information if necessary for synthesizing with the video and audio information. It is desirable to correct the parameter or element information included in the bodily sensation information by matching with characteristics of its own apparatus.

The video and audio information reproduction unit 32 takes in only the video and audio information from the content acquired by the content acquisition to check whether or not the taken information is reproducible, reproduces the information after its optimization if necessary, and sends the information to the presentation processing unit 33. Here, if the content has been encrypted, the information reproduction unit 32 decodes the content. If there is some possibility of existing of all or a part of items of the bodily sensation information, the optimization deletes the unnecessary part therefrom, and if there is some possibility that the video and audio information has a bad influence on the presentation processing unit 33 due to the bodily sensation information, the optimization corrects the video and audio information. It is desirable for the information reproduction unit 32 to instruct the content to be optimized to the processing unit 33. The processing unit 33 receives the video and audio information reproduced by means of the information reproduction unit 32, converts the received information into respective signal forms, and outputs them to a presentation device (not shown) such as a display and a loud-speaker.

On the other hand, the bodily sensation information reproduction unit 34 receives the bodily sensation information from the content acquired by the content acquisition unit 31 (receives all or a part of items of video and audio information if necessary), analyzes the correspondence between the content of the bodily sensation information and the video and voice information, and sends the analysis result to the bodily sensation control unit 25 applying drive control to a bodily sensation generation device (not shown). If there are a plurality of bodily control units 35 and if they manage the different bodily sensation generation devices, respectively, the information reproduction unit 34 sends results of bodily sensation information analyses to the control units 35 corresponding to the content of the reproduced bodily information. Each bodily sensation control unit 35 sends a drive control signal corresponding to the result of the bodily sensation analysis to the connected bodily sensation generation device. Thereby, the information reproduction unit 34 can drive the bodily sensation generation devices in synchronization with the reproduction of the video and audio information, and provide arbitrary bodily sensation in a time period intended by the producer.

It is desirable for the control unit 35 to correct a drive and control signal based on the result of the bodily sensation information analysis in accordance with the characteristics or the setting of the bodily sensation devices.

The bodily sensation control unit 35 applies drive control to the bodily sensation generation devices on the basis of the information, with the numeric conversion applied thereto, which is the result of the bodily sensation information analysis from the bodily sensation information reproduction unit 34. For instance, if the information is movement information of longitudinal and right-and-left directions, the control unit 35 performs fine vibration movement in the longitudinal and right-and-left directions according to numeric value information based on a sampling cycle. The control unit 35 also controls at fine intervals even if the numeric value information is wind direction information or wind speed information. Thereby, the content reception and reproduction apparatus 30 can provide further real bodily sensation. For reproducing the numeric value information, the control unit 35 may correct the bodily sensation information in accordance with the characteristics or the setting of its own apparatus.

While the embodiment given above has been configured as a system configuration in which the content generation and distribution apparatus 10 and the content reception and reproduction apparatus 30 are connected with each other via the communication line 20, both a content generation unit and a content reproduction unit may be disposed in one terminal device. And the units of which the respective functions are described separately may be united.

According to the aforementioned configuration, a procedure generating the content with the bodily sensation information will be described.

Figure 2:
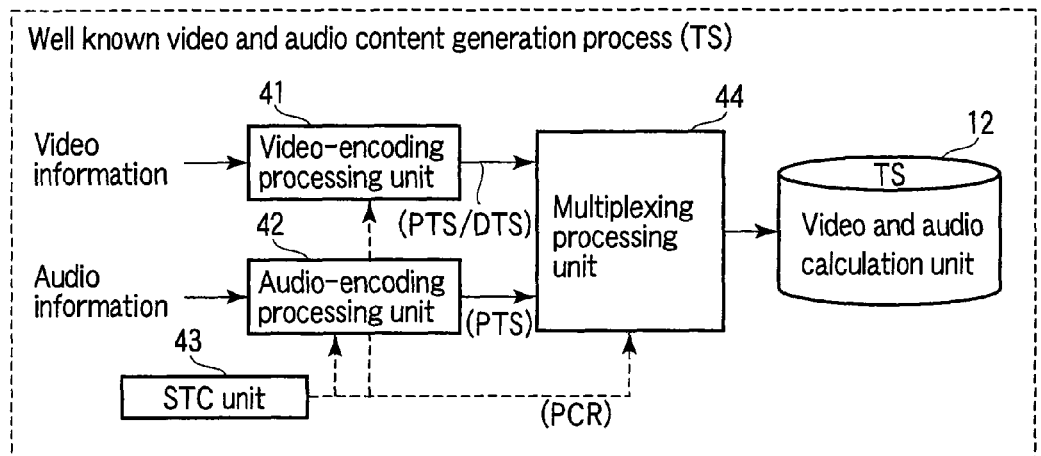
FIG. 2 is an exemplary block diagram depicting generation processes of content in the embodiment.

FIG. 2 shows a block diagram illustrating generation processes of video and audio information in a TS format. In FIG. 2, video information and audio information are compressed and encoded by a video-encoding processing unit 41 and an audio-encoding processing unit 42, respectively, and then, sent to a multiplexing processing unit 44. The multiplexing processing unit 44 converts the compressed and encoded video information and the audio information into signals, respectively, for example, with packet structures in an MPRG 2-TS format, and multiplexes both the signals by sequentially arranging the video packets and the audio packets. The multiplexed signals of the video and audio information generated in this manner are accumulated in the video and audio information accumulation unit 12. At this moment, the video-encoding processing unit 41 receives a system time clock (STC) from a STC unit 43, generates a personal time stamp (PTS)/decoding time stamp (DTS), and embeds them in the audio-encoded data. The multiplexing processing unit 42 also receives the STC, generates the PTS from the corresponding-STC, inserts a program clock reference (PCR), changes the value of the PCR, and changes a position of a PCR packet on the basis of the corresponding-STC.

Figure 3:
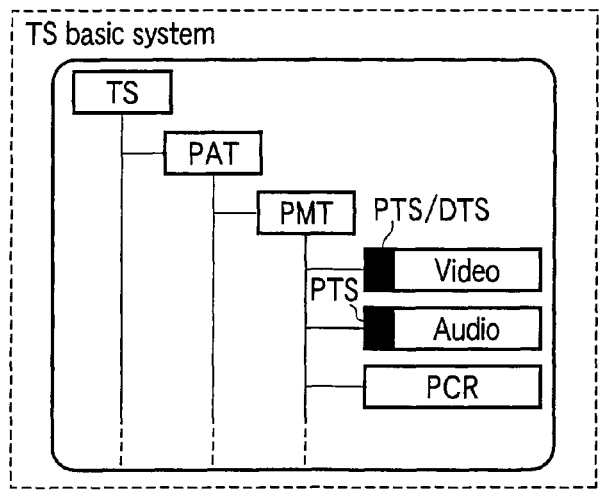
FIG. 3 is an exemplary schematic view depicting a time stamp (TS) basic system of the content in the embodiment.

As shown in FIG. 3, the TS basic system of the video and audio multiplexed signal generated in the foregoing processes has a hierarchic structure of a transport stream (TS), a program association table (PAT), and a program map table (PMT), and packetized elementary stream (PES) packets, such as video, audio, and PCR, are arranged under the PMT. The PTS/DTS is inserted into the header of the video packet, and the PTS is inserted into the header of the audio packet.

Meanwhile, the content generation unit 13 embeds the bodily sensation information by using the MPEG 2-TS structure of the video and audio multiplexed signal. Particularly, as shown in FIG. 4, the bodily sensation parameter may be arranged at ant position (under each TS, PAT and TMT) in the TS. The bodily sensation information elements (numerically converted information) PTS/DTS inserts the PTS/DTS into its header to arrange them under the PMT, and inserts identification information including the bodily sensation information elements into the header of the PMT. Regarding the identification information, for example, a stream type and an elementary PID can be used.

An option of a PES header follows the ITU-T recommendations H.222. A stream identifier in the PES packet may use at least one of an auxiliary stream (0xF9), metadata stream (0xPC), an extended stream ID (0xFD), and undefined (0xFD) of ARIB STD-B32 2.1 version.

According to the content generation and distribution system with the configuration given above, since the system can apply the numeric conversion to the bodily sensation information realizing the arbitrary effect of the representation, use the existing format structure, for example, the MPEG 2-TS, and distribute the bodily sensation information multiplexed on the video and audio encoded data, if the content with the bodily sensation content is received, the system can easily separate the content into the video/audio information and the bodily sensation information on the reception side, and also reproduce the arbitrary bodily sensation information in synchronization with the video and audio information.

Even a conventional apparatus which is compatible with, for example, MPEG 2-system can reproduce the video and audio information, and avoid the influence by the bodily sensation information.

The invention is not limited to the specific details and representative embodiments shown and described herein, and in an implementation phase, this invention may be embodied by modifying constituent elements without departing from the spirit or scope of the general inventive concept thereof. For instance, while the foregoing embodiments have described in a case where the number of programs which can be recorded simultaneously is set to two, even the programs of the number larger than two can be treated in the same manner. Various types of the invention can be formed by appropriately combining a plurality of constituent elements disclosed in the foregoing embodiments. Some of the elements, for example, may be omitted from all the constituent elements shown in the embodiments mentioned above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content provision system configured to provide content including main information which is at least either of video information and audio information generated by a content generation apparatus to a content reproduction apparatus, wherein the content generation apparatus comprises:
  a first generator configured to generate a bodily sensation element by applying numeric conversion to characteristics of a bodily sensation given to a user;
  a second generator configured to generate instruction information to reproduce the bodily sensation element in synchronism with reproduction of the main information;
  a third generator configured to generate bodily sensation information by adding the instruction information to the bodily sensation element; and
  a fourth generator configured to generate content including the bodily sensation information by adding the bodily sensation information to the main information,
wherein the fourth generator includes the bodily sensation information in one of a Program Association Table (PAT) packet, a Program Map Table (PMT) packet and a Packetized Elementary Stream (PES) packet when the main information has a Moving Picture Export Group 2-Transport Stream (MPEG-TS) structure, and inserts, in a header of the one packet, identification information indicating that the one packet includes the bodily sensation information, the content reproduction apparatus comprises:
  a first separator configured to separate the main information and the bodily sensation information from the content;
  a first reproduction unit configured to reproduce the main information;
  a second separator configured to separate the bodily sensation element and the instruction information from the bodily sensation information; and
  a second reproduction unit configured to reproduce the bodily sensation element based on the instruction information,
wherein the first separator separates the bodily sensation information, included in the one packet, from the main information of the MPEG-TS structure, based on the identification information inserted in the header of the one packet.

2. A content generation apparatus comprising:
a first generator configured to generate bodily sensation element by applying numeric conversion to a characteristic of a bodily sensation;
a second generator configured to generate instruction information to reproduce the bodily sensation element in synchronism with reproduction of the main information which is at least either of video information and audio information;
a third generator configured to generate bodily sensation information to the bodily sensation element; and
a fourth generator configured to generate content including the bodily sensation information by adding the bodily sensation information to the main information,
wherein the fourth generator includes the bodily sensation information in one of a Program Association Table (PAT) packet, a Program Map Table (PMT) packet and a Packetized Elementary Stream (PES) packet when the main information has a Moving Picture Export Group 2-Transport Stream (MPEG-TS) structure, and inserts, in a header of the one packet, identification information indicating that the one packet includes the bodily sensation information.

3. The apparatus according to claim 2, wherein
the first generator comprises an accumulation unit configured to accumulate a plurality of kinds of bodily sensation element obtained by applying numeric conversion to respective characteristics of a plurality of kinds of bodily sensation.

4. The apparatus according to claim 2, wherein
the second generator generates one of a kind of bodily sensation, a reproduction period, and a volume as the instruction information.

5. A content reproduction apparatus which reproduces content with the bodily sensation information according to claim 2, the apparatus comprising:
a first separator configured to separate the main information and the bodily sensation information from the content;
a first reproduction unit configured to reproduce the main information;
a second separator configured to separate the bodily sensation element and the instruction information from the bodily sensation information; and
a second reproduction unit configured to reproduce bodily sensation element based on the instruction information,
wherein the first separator separates the bodily sensation information, included in the one packet, from the main information of the MPEG-TS structure, based on the identification information inserted in the header of the one packet.

\* \* \* \* \*